PHONOGRAPH PICKUP STYLUS HOLDING DEVICE

Filed Oct. 30, 1947

*INVENTOR.*
THOMAS E. LYNCH
*BY*
[signature]
ATTORNEY

Patented Nov. 4, 1952

2,616,709

UNITED STATES PATENT OFFICE 2,616,709

PHONOGRAPH PICKUP STYLUS HOLDING DEVICE

Thomas E. Lynch, Cleveland, Ohio, assignor to The Brush Development Company, Cleveland, Ohio, a corporation of Ohio Application October 30, 1947, Serial No. 783,149
In Great Britain March 21, 1947

5 Claims. (Cl. 274—37)

This invention pertains to a phonograph pickup stylus-holding arrangement.

Prior art phonograph pickup stylus devices have suffered from one or more disadvantages such as: excessive static stylus force on the phonograph record; high inertia forces on the side walls of the record grooves during reproduction of the record; difficulty of replacing the stylus tip after it has become worn, etc.

An object of this invention is to provide a phonograph pickup stylus-holding arrangement which obviates each of the above-enumerated disadvantages of the prior art stylus-holding arrangements, as well as other disadvantages which have not been specifically set forth.

Another object of the invention is to provide a phonograph pickup stylus-holding arrangement in which a very small, lightweight stylus is utilized.

A further object of the invention is to provide a stylus-holding arrangement by which a stylus of the permanent-point type may easily be replaced by the average user of phonographs.

In accordance with this invention there is provided a phonograph pickup stylus-holding arrangement comprising a tubular member and a flexible arm member having an end portion adapted to be inserted within and removably connected to an end portion of the tubular member. A stylus is attached to the free end of one of the members and means are provided for mounting the free end of the other member to an electromechanical transducer. The connected end portion of one of the members is bent with respect to the connected end portion of the other member so that the connected end portion of the flexible arm member is in close frictional engagement with the connected end portion of the tubular member to provide the removable connection.

For a better understanding of the present invention, together with other and further objects thereof, reference is had to the following description taken in connection with the accompanying drawings, and its scope will be pointed out in the appended claims.

Figures 1, 2:
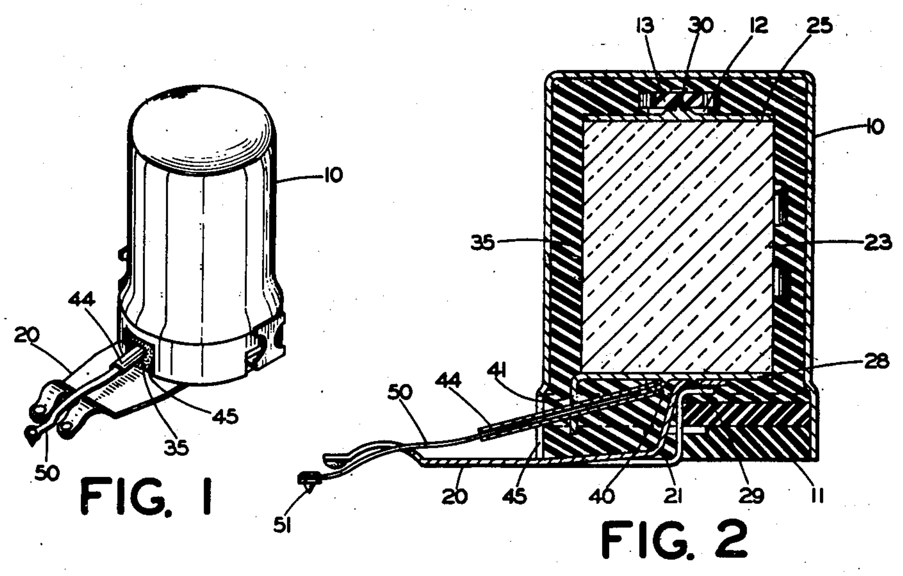
Figure 3:
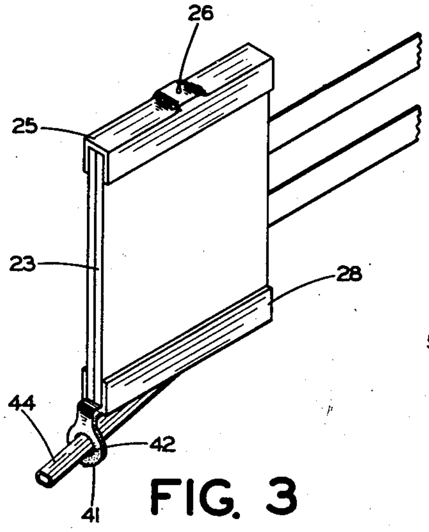
Figure 4:
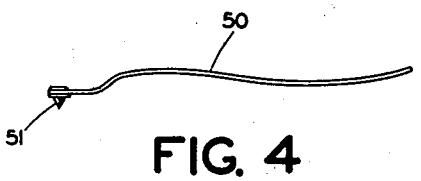
Figure 5:
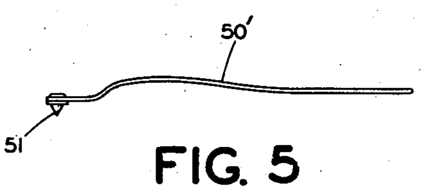
Figure 6:
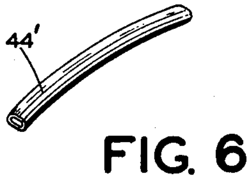

In the single sheet of drawing Fig. 1 is an isometric view of a phonograph pickup embodying the invention; Fig. 2 is a sectional view through the pickup; Fig. 3 is an isometric view of the transducer assembly of said pickup; Fig. 4 is a side view of a stylus assembly adapted to be replaceably connected to the pickup shown in Fig. 3; Fig. 5 is a side view of a modified stylus assembly; and Fig. 6 is an isometric view of a portion of the transducer assembly shown in Fig. 3 modified to accommodate the stylus assembly shown in Fig. 5.

With reference to the drawing, there is shown in Fig. 1 a phonograph pickup of the type which is shown, described and claimed in the application for United States Letters Patent Serial No. 783,148 (now Patent No. 2,594,948, granted April 29, 1952), filed concurrently herewith in the name of Thomas E. Lynch, and assigned to the same assignee as the present application. Reference may be had to the aforesaid application for details of the construction of the pickup as well as for a complete explanation as to the theory and operation of the pickup.

Briefly the pickup comprises a cannister 10, the open end of which is closed by a base 11. A harness member comprising two upstanding leg members 12, only one of which is shown, is mounted on the base 11. One of the leg members 12 supports one end of a cross-bar 13 and the other leg member supports the other end of the cross-bar 13. A stylus guard 20 is connected to the base 11 and it includes a raised central portion 21 preferably formed of metal to provide a spring action.

A saddle member 25 carrying a pivot point 26 is connected to the top edge of a piezoelectric crystal element 23, and a cradle member 28 carrying a pivot member 29 is connected to the lower edge of the crystal element 23. The pivot point 26 extends into a detent 30 in the cross-bar 13 and the pivot point 29 extends into a hole in the raised central portion 21 of the stylus guard 20. The crystal element is thereby pivotably mounted between the cross-bar 13 and the raised central portion 21 of the stylus guard 20, and is resiliently biased against the upper cross-bar 13.

The cannister 10 is filled with a semi-solid material 35 which resiliently resists torsion of the crystal 23, as is explained in detail in the aforementioned application.

The cradle member 28 includes a centrally located downwardly extending leg member 40, and its end 41 also extends in a downward direction and has a hole 42 extending through it. One end of a tubular quill 44 extends over the downwardly extending leg 40 and is connected to it, as by soldering. The tubular quill 44 extends through the hole 42 in the end of the cradle 28 and is soldered to the cradle at that point. The other end, or free end, of the tubular quill extends to the outside of the cannister 10 through an opening 45.

A stylus assembly, comprising a flexible arm member 50 having a permanently attached stylus tip 51, is provided. The end of the flexible arm 50 opposite the stylus tip 51 is bent in a long, gentle arc, as is shown at the righthand end of the stylus assembly shown in Fig. 4. This end portion of the stylus assembly is adapted to be inserted within the tubular member 44 leaving a considerable length of the flexible arm outside of the tubular member 44. The flexibility of the portion of the stylus arm member 50 which remains outside of the tubular member 44 permits the stylus tip 51 to respond to vertical forces due to warped records and to "pinch effect." Due to the straightening of the gentle curve of the end of the arm as it is inserted, sufficiently high frictional forces are set up between the tubular member 44 and the stylus arm 50 to hold the arm firmly in place. The stylus assembly may be easily removed from the tubular member 44, however, simply by pulling it out therefrom. No special tools are needed and the force required to pull it out is relatively small. A new stylus assembly is put into place simply by pushing the end of the stylus arm up into the tube 44. It is not essential that the tube 44 be straight and that the stylus arm 50 be bent, although such a construction is preferable due to the practical consideration that it is easier uniformly to bend a large number of flat strips of material than it is uniformly to bend a large number of tubular members.

Fig. 5 illustrates a stylus assembly 50′ wherein the righthand end of the stylus arm is straight. Such a stylus arm is adapted to extend into an arcuately curved tubular member 44 such as is shown in Fig. 6.

It is also within the scope of the invention that both the stylus arm member 50 and the tubular member 44 may be bent in the same direction so long as one of the members is bent substantially more than the other member, and it is within the scope of the invention that both the members may be bent substantially the same amount if they are bent in different directions.

The stylus arm assembly comprised of the jewel tip 51 permanently mounted in the spring metal arm 50 weighs approximately .0015 ounce, and the tubular member 44 which connects the stylus arm assembly to the transducer 23 weighs even less than the stylus arm assembly. Consequently, the dynamic stylus forces on the side walls of a record groove are maintained at a very low level, resulting in much longer record life. Excellent record tracking is obtained because the stylus 51 is biased toward the record by the resiliency of the stylus arm 50 which is bent when a record is being reproduced, forces of approximately one-half ounce being sufficient to assure proper tracking.

Thus, there is provided a phonograph pickup stylus-holding arrangement comprising a tubular member 44 and a flexible arm member 50. An end portion of the flexible arm member 50 is adapted to be inserted within an end portion of the tubular member 44 to establish a removable connection. A stylus 51 is attached to the free end of one of the members 44, 50; as shown in Fig. 2 it is connected to the free end of the flexible arm member 50. Means such as the cradle 28 are provided for mounting the free end of the other member 44 to an electromechanical transducer 23, for example a piezoelectric crystal element. The connected end portion of one of the members 44, 50 is bent substantially more than the connected end portion of the other member so that the connected end portion of the flexible arm member 50 is in close frictional engagement with the connected end portion of the tubular member 44 to provide the removable connection. In the construction shown in Figs. 2, 3 and 4 it is the free end of the flexible arm member 50 which is bent with respect to the free end of the tubular member 44, and in Figs. 5 and 6 it is the tubular member 44′ which is bent substantially more than the free end of the flexible arm member 50′.

While there have been described what are at present considered to be the preferred embodiments of this invention, it will be obvious to those skilled in the art that various changes and modifications may be made without departing from the invention, and it is, therefore, aimed in the appended claims to cover all such changes and modifications as fall within the true spirit and scope of the invention.

What is claimed is:

1. A stylus-holding device for a phonograph pickup including a plate-like electromechanical transducer which is twisted in operation comprising: a cradle member having a centrally located downwardly extending leg member and an end portion which extends downwardly to a location below said leg member connected along the lower edge of said transducer; a tubular member connected at one end to said leg member and connected to the end portion of said cradle member; a flexible arm member a portion of which is replaceably positioned within said tubular member and is in frictional engagement with the inner walls thereof; and a stylus tip permanently connected to the outer end of said flexible arm member.

2. A stylus holding device for a phonograph pickup including a platelike electromechanical transducer which is twisted in operation comprising: a cradle member having a centrally located downwardly extending leg member and an end portion which extends downwardly to a location below said leg member connected along the lower edge of said transducer, an actuating arm member connected at one end to said leg member and connected to the end portion of said cradle member, and a stylus arm member including a stylus tip replaceably connected to said actuating member.

3. A stylus holding device as set forth in claim 2, further characterized by one of said arm members being tubular in cross-section and by the other arm member being comprised of flat spring material.

4. A stylus holding device for a phonograph pickup including a plate-like electromechanical transducer which is twisted in operation comprising: a channel member engaging an edge of said transducer element in said channel, a locating member connected to and extending outwardly from the bottom of said channel member, a tubular member having means at one of its ends in mating connection with said locating member, a flexible arm having an end portion adapted to be inserted within and removably connected to the other end of said tubular member, and a stylus permanently connected to the other end of said flexible arm, the end of said flexible arm which is inserted within said tubular member being bent with respect to the portion of the tubular member within which it is inserted so that when inserted the flexible arm is straightened and is in close but removable frictional engagement with said tubular member to provide said removable connection.

5. A stylus holding arrangement as set forth in claim 4, further characterized by said channel member having an end portion extending outwardly away therefrom in the same direction as said locating member and at a distance from said locating member, said tubular member being connected to said end portion.

THOMAS E. LYNCH.

REFERENCES CITED

The following references are of record in the file of this patent:

UNITED STATES PATENTS

| Number | Name | Date |
|---|---|---|
| 812,512 | Mills | Feb. 13, 1906 |
| 831,995 | Runge | Sept. 25, 1906 |
| 1,290,295 | Muller | Jan. 7, 1919 |
| 1,475,227 | Ferguson | Nov. 27, 1923 |
| 2,177,239 | Bird | Oct. 24, 1939 |
| 2,280,763 | Hasbrouck | Apr. 21, 1942 |
| 2,326,424 | Andres | Aug. 10, 1943 |
| 2,359,808 | Thompson | Oct. 10, 1944 |
| 2,363,497 | Begun | Nov. 28, 1944 |
| 2,432,444 | Roberts | Dec. 9, 1947 |
| 2,478,712 | Rockwell | Aug. 9, 1949 |
| 2,501,872 | Mencke | Mar. 28, 1950 |
| 2,502,242 | Andres | Mar. 28, 1950 |
| 2,563,196 | Spry | Aug. 7, 1951 |
| 2,565,837 | Ansar | Aug. 28, 1951 |